June 12, 1923.  1,458,655
M. H. JAHN
AGRICULTURAL IMPLEMENT
Filed April 27, 1922   2 Sheets-Sheet 1
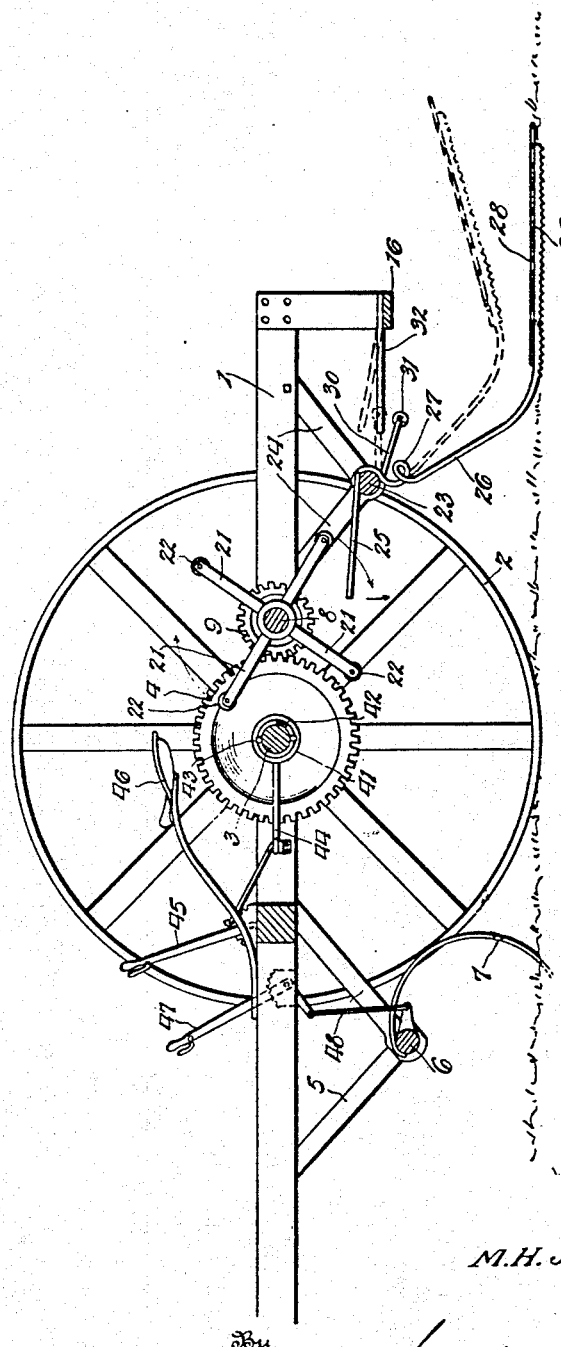
Inventor
M. H. Jahn.

June 12, 1923.
M. H. JAHN
1,458,655
AGRICULTURAL IMPLEMENT
Filed April 27, 1922
2 Sheets-Sheet 2
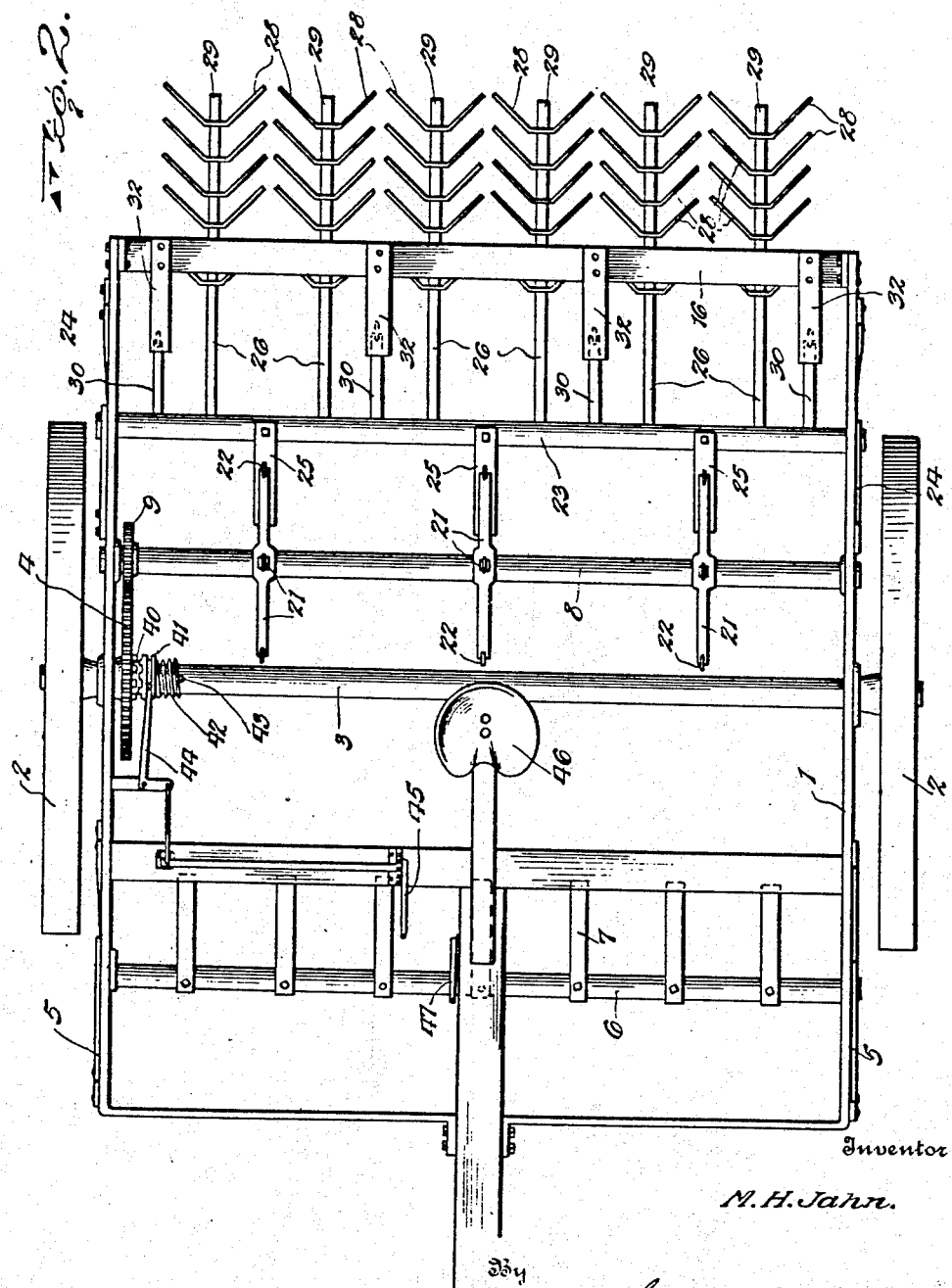
Inventor
M. H. Jahn.
By Lacey & Lacey, Attorneys Patented June 12, 1923.

1,458,655

UNITED STATES PATENT OFFICE.

MAX H. JAHN, OF GLOVERSVILLE, NEW YORK.

AGRICULTURAL IMPLEMENT.

Application filed April 27, 1922. Serial No. 556,882.

*To all whom it may concern:*

Be it known that I, MAX H. JAHN, a citizen of the United States, residing at Gloversville, in the county of Fulton and State of New York, have invented certain new and useful Improvements in Agricultural Implements, of which the following is a specification.

This invention relates to agricultural implements and has for its object the provision of a machine by the use of which the surface soil will be thoroughly pulverized and put in condition for planting. The invention seeks to provide means for accomplishing the stated purpose which may be used simultaneously with a harrow or cultivator, or may be used independently of other implements, and the invention further seeks to provide a soil pulverizing mechanism of such a type that the surface soil will be beaten as the machine is drawn over the field, and hard lumps will be effectually broken up and reduced to a fine mulch. Incidental objects of the invention will appear in the course of the following description.

The invention is illustrated in the accompanying drawings in which;

Figure 1 is a view partly in side elevation and partly in section of an implement embodying my improvements;

Figure 2 is a plan view of the same.

In the drawings, the reference numeral 1 indicates a frame of any preferred form which may be drawn over a field by draft animals or by a tractor, and is supported by ground wheels 2 mounted upon an axle 3. Upon the axle is loosely mounted a driving gear wheel 4 which is provided with a clutch 40 adapted to be engaged by a clutch sleeve 41 slidably mounted on the axle but constrained to rotate therewith. A spring 42 is coiled around the axle between the clutch sleeve and an abutment 43 on the axle and holds the sleeve toward and in engagement with the clutch hub, a lever 44 being engaged with the clutch sleeve and supported in any convenient manner on the frame. This lever 44 is controlled by a hand lever 45 mounted on the frame at a point convenient to the driver's seat 46. In the illustrated form of the invention, hangers 5 are secured to the forward portion of the main frame, and these hangers carry a rocking shaft or harrow bar 6 to which are secured a series of spring harrow teeth 7, a hand lever 47 being provided to adjust the teeth through link connections 48.

Journaled to the main frame in rear of the axle 3 is a shaft 8 which is equipped at one end with a pinion 9 meshing with the driving gear 4 so that the said intermediate shaft 8 will be caused to rotate in a direction reverse to the direction of the rotation of the axle.

Upon the shaft 8 at intervals along the same are secured cranks 21 equipped with rollers 22 at their ends, and these cranks will obviously rotate with the shaft. In rear of the said intermediate shaft 8, a beater shaft 23 is journaled in hangers 24 carried by the main frame, and this beater shaft 23 is equipped with forwardly projecting arms 25, which will preferably be leaf springs, and are disposed respectively in the paths of the cranks 21 as clearly shown. The beater shaft 23 carries a series of rearwardly projecting beaters each consisting of a shank 26 which is provided with a coil spring or loop 27 near its upper forward end and secured at its extremity to the beater shaft, and a plurality of rods 28 secured to and projecting laterally beyond the sides of the rearwardly extending portions 29 of the shanks. Disposed alternately with the arms 25 are a plurality of rearwardly projecting arms 30 which are secured to the beater shaft and are equipped with rollers 31 at their free ends, the said arms 30 being disposed in the planes of presser springs which are secured to and project forwardly from the rear cross bar 16 of the main frame.

It is thought the operation of the implement will be readily understood from the foregoing description taken in connection with the accompanying drawings. As the machine is drawn over the field, motion will be imparted to the intermediate shaft 8 so that the arms or cranks 21 thereon will be caused to travel downwardly against the arms 25 and depress said arms as indicated by the dotted lines in Figure 1. The downward movement of the arms 25 will, of course, rock the beater shaft 23 so that the beaters will be raised as indicated by the dotted lines in Figure 1. As the cranks 21 clear the arms 25 the weight of the beaters and the pressure of the springs 32 thereon will cause them to fall, rocking the shaft 23 in the opposite direction so that the beaters will be brought forcibly against the surface soil, and will, by their impact therewith, break up all lumps which may have been left unbroken by the harrow teeth. Breaking strain upon the respective beaters will be avoided, as the resilient connection between the beater shaft and the shanks of the beaters will permit the beaters to yield somewhat to their contact with the ground and prevent bending and breaking of the parts. Moreover, this yieldable connection between the beater shaft and the respective beaters will permit any one beater to move upwardly independently of the other beaters so that it may yield to stones, or other unyielding obstructions, which it may encounter and thereby avoid serious damage to the machine.

The beaters will act upon the entire surface of the field and will thoroughly pulverize the same without digging thereinto so that the soil will be left in a firm, even, level condition, and a fine seed bed produced. The beaters may be of any desired design but I prefer to have the lateral members 28 thereof inclined rearwardly, as shown, so that trash will be turned aside.

Having thus described the invention, what is claimed as new is:

1. In an implement for the purpose set forth, the combination of a supporting frame, a beater shaft mounted thereon, means for continuously rocking said shaft, and beater arms secured to and projecting rearwardly and downwardly therefrom.

2. In an implement for the purpose set forth, the combination of a supporting frame, a beater shaft mounted thereon, means for continuously rocking said shaft, and a plurality of resilient beaters carried by said shaft.

3. In a machine for the purpose set forth, the combination of a supporting frame, a beater shaft mounted in said frame, a plurality of beaters yieldably secured to said shaft, and means for continuously rocking the shaft and beaters.

4. In an implement for the purpose set forth, the combination of a supporting frame, a beater shaft mounted in the frame, a plurality of beaters carried by said shaft, means for continuously rocking the shaft, a plurality of arms carried by the shaft, and return springs acting upon said arms.

5. In an implement for the purpose set forth, the combination of a supporting frame, a beater shaft mounted in the frame, beaters carried by the shaft, a plurality of radial arms projecting forwardly from the shaft, an actuating shaft mounted in the frame, and cranks carried by said shaft and adapted to impinge upon said arms.

6. In an implement for the purposes set forth, the combination of a supporting frame, a beater shaft mounted transversely of the frame, a plurality of resilient beaters secured to and extending downwardly and rearwardly from said shaft, a plurality of radial arms fixed to the beater shaft and projecting forwardly therefrom, an actuating shaft mounted in the frame above and in advance of the beater shaft, a plurality of cranks on the actuating shaft arranged to impinge upon and depress said forwardly projecting arms, a plurality of radial arms projecting rearwardly from the beater shaft, and a plurality of presser springs secured upon the supporting frame and projecting forwardly into the paths of the rearwardly projecting radial arms to yieldably resist upward movement of said arms.

In testimony whereof I affix my signature.

MAX H. JAHN. [L. S.]